United States Patent [19]

Hippenmeyer

[11] Patent Number: 4,851,698
[45] Date of Patent: Jul. 25, 1989

[54] TELECENTRIC IMAGE FORMING SYSTEM WITH A ROW CAMERA

[75] Inventor: Heinrich Hippenmeyer, Freiamt/Brsg., Fed. Rep. of Germany

[73] Assignee: Erwin Sick GmbH Optik Elektronik, Waldkirch, Fed. Rep. of Germany

[21] Appl. No.: 162,849

[22] Filed: Mar. 2, 1988

[30] Foreign Application Priority Data

Mar. 12, 1987 [DE] Fed. Rep. of Germany ....... 3707979

[51] Int. Cl.$^4$ .............................. H01J 40/14
[52] U.S. Cl. ................................ 250/578; 358/214
[58] Field of Search ............. 350/6.1, 6.5, 6.6, 6.7, 350/6.8, 630, 169, 174; 358/214, 212, 237, 238, 106, 107; 354/95, 117; 356/376, 384; 250/578

[56] References Cited

U.S. PATENT DOCUMENTS 3,892,468  7/1975  Duguay ........................ 350/169
4,116,527  9/1978  Sick .............................. 350/6.7
4,165,149  8/1979  Suzki et al. .................... 350/6.1
4,199,219  4/1980  Suzki et al. .................... 350/6.1
4,280,142  7/1981  Stemme et al. ................. 358/214

Primary Examiner—Bruce Y. Arnold
Assistant Examiner—Loha Ben
Attorney, Agent, or Firm—Townsend & Townsend

[57] ABSTRACT

A telecentric image forming system for a linear zone on the surface of an object comprises a diode row camera with a telecentric imaging system at the object side. In the present embodiment the pupil of the normal, non-telecentric, camera objective (15) is arranged in the focal plane of a spherical concave mirror strip (13) which lies parallel to the direction of the diode row (16). Furthermore, the concave mirror strip (13) and the camera objective (15) jointly form the image of the linear zone on the diode row (16). With this arrangement relatively long linear zones can be illuminated without the need to provide a telecentric camera objective with a diameter substantially equal to that of the length of the zone.

8 Claims, 3 Drawing Sheets

TELECENTRIC IMAGE FORMING SYSTEM WITH A ROW CAMERA

FIELD OF INVENTION

The invention relates to a telecentric image forming system for a linear zone on the surface of an object comprising a diode row camera with a telecentric imaging system at the object side.

OBJECT OF THE INVENTION

The object underlying the invention is to keep the image size constant when defocussing occurs throughout the entire range of sharpness.

SUMMARY OF THE INVENTION

The invention is characterized in that the pupil of the normal non-telecentric camera objective is arranged in the focal plane of a spherical concave mirror strip which lies parallel to the direction of the diode row; and in that the concave mirror strip and the camera objective jointly form the image of the linear zone on the diode row.

Cameras, and in particular also row cameras with telecentric imaging systems at the object side, have the advantage over non-telecentric cameras that on defocussing of the image forming optical system, for example by a change of the distance object-camera objective, the image size remains constant within the total range of sharpness. This is above all of advantage when measuring distances on the object surface. Object structures with depths within the range of sharpness can thus be measured without error.

A telecentric observing or viewing objective has a front lens diameter which is somewhat larger than the required illumination length. For 100 mm illumination length the front lens diameter may for example amount to 120 mm. By the additional provision of the strip-like concave mirror of the invention the illumination length can readily be increased by a factor of 10 and thus comes into a region which can be realized with the known laser scanners. Accordingly telecentric observing systems for row cameras can thus be realized which illuminates linear zones from 1 to 2 m length.

For the realization of the object side telecentric image forming system a normal camera objective is so combined with a spherical concave mirror strip that the object is imaged via this concave mirror strip, and expediently via one or more plane mirror strips, through the camera objective onto the diode row. In this arrangement the pupil of the camera objective is arranged in the focal plane of the concave mirror and the object is arranged in the same or at a smaller distance from the concave mirror.

If the object is spaced by the focal length from the concave mirror then the camera objective is set to infinity in order to realize a sharp image on the diode row of the linear zone on the surface of the object. If the object is closer to the concave mirror than its focal length, then the camera objective must merely be set to lower distances than infinity in order to form a sharp image of the surface of the object on the diode row.

It is particularly expedient when the concave mirror is of spherical construction.

In order to exploit the strip-like concave mirror and optionally also the plane mirror strip for the illumination of the object a further embodiment of the invention envisages that a beam division takes place in front of the objective of the row camera via a preferably physical beam divider, and that, via a collector, a light source which is of strip-like construction similar to the diode row is coupled into the beam path via the divider mirror. This signifies that on using a specularly reflecting object the latter is normally illuminated (perpendicular to its surface) in autocollimation. In the event of an at least partially transparent object provision is expediently made that a retroreflector built-up of many individual elements is arranged behind the object, is of strip-like construction and extends parallel to the direction of the diode row.

BRIEF DESCRIPTION OF THE DRAWING

The invention will now be described in the following by way of example and with reference to the drawing in which are shown.

DESCRIPTION OF THE PREFERRED EMBODIMENTS

Figure 1:
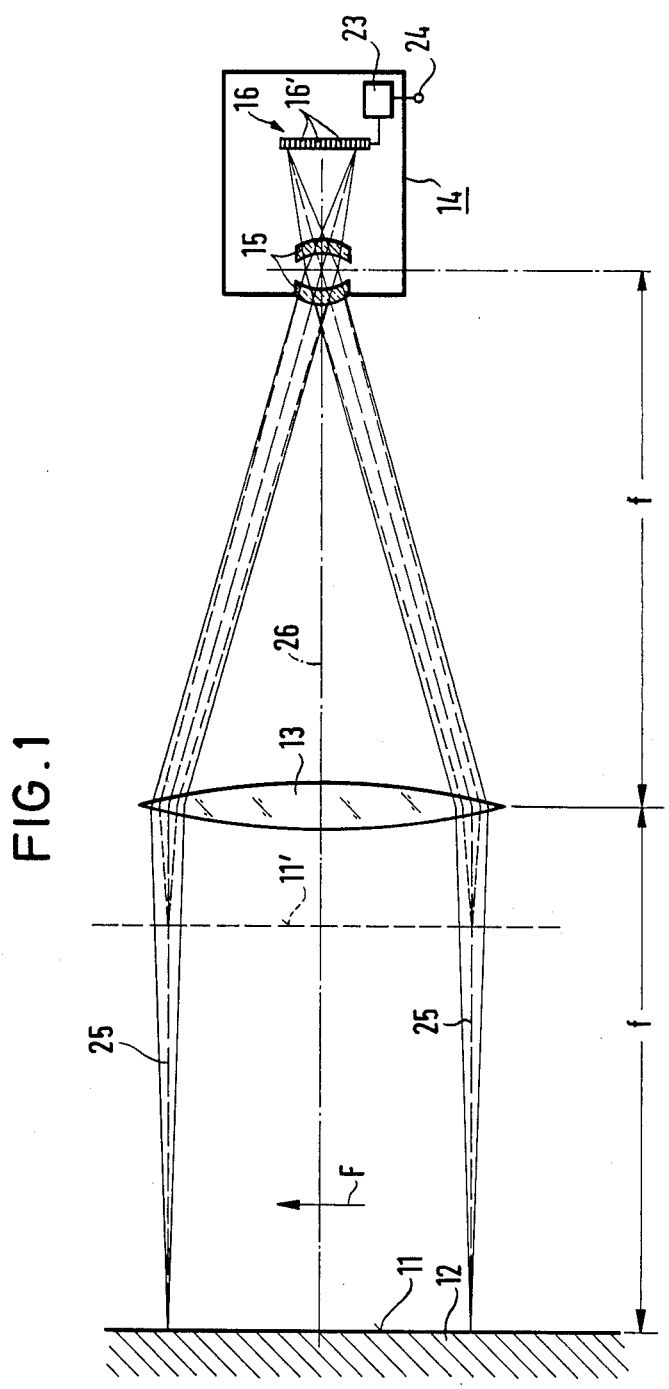
FIG. 1 in schematic side view, the basic principle of the beam path of a telecentric image forming system in accordance with the invention, with the strip-like concave mirror being shown as a lens for the simplicity of the illustration, FIG. 2 a telecentric image forming system for a transparent object with additional representation of the illuminating beam path, FIG. 3 a plan view of the telecentric image forming system of FIG. 2, and FIG. 4 a further embodiment of a telecentric image forming system in a side view analogous to FIG. 2.

A stretched construction can be seen in FIG. 1 in which the concave mirror and the plane mirror strip which is necessary are replaced by a strip-like lens 13 of the same focal length in order to make clear the path of the beams by which the points of the linear zone on the illuminated or luminous surface 11 of the object 12 are imaged onto the individual diodes 16' of the diode row 16 of a diode row camera 14. The following description of FIG. 1 will however speak again of the strip-like concave mirror 13 of the same focal length.

The diode row camera 14 has an objective 15 which forms an image of the surface 11 of the object 12 on the diode row 16 via the strip-like concave mirror 13. The diode row 16 is connected to an electronic processing circuit 23 which interrogates the individual diodes 16' of the row one after the other and thus recognizes at which point a fault is present on the surface 11 of the object 12. A corresponding fault signal is transmitted at the output 24 of the electronic processing circuit 23.

It can be seen from the telecentric beam path on the object side that the principal rays 25 at the object side extend parallel to one another before they impinge on the concave mirror 13. In accordance with FIG. 1 the surface 11 of the object 12 is arranged spaced by the distance of the focal length f of the concave mirror 13 from the latter and parallel thereto. The objective 15 of the diode row camera 14 likewise has a distance corresponding to this focal length f from the concave mirror 13 independently of its own focal length. As a result of the arrangement of the object in the front focal plane of the concave mirror 13 the latter acts as a magnifying glass and forms an image of the surface 11 of the object at infinity. The objective 15 of the diode row camera 14 is likewise set to infinity so that the linear zone on the surface 11 is sharply imaged on the diode row 16.

If the surface 11 of the object 12 is moved closer to the strip-like concave mirror 13, and indeed for example to the position 11' illustrated in broken lines in FIG. 1, then the telecentric beam path is retained at the object side, however the strip-like concave mirror 13 now only operates as a field lens and the objective 15 of the diode row camera 14 must be set to a correspondingly shorter distance.

In both cases the length illuminated in the object is restricted by the length of the strip-like concave mirror 13, it is therefore many times greater than the diameter of the camera objective 15.

Figure 2:
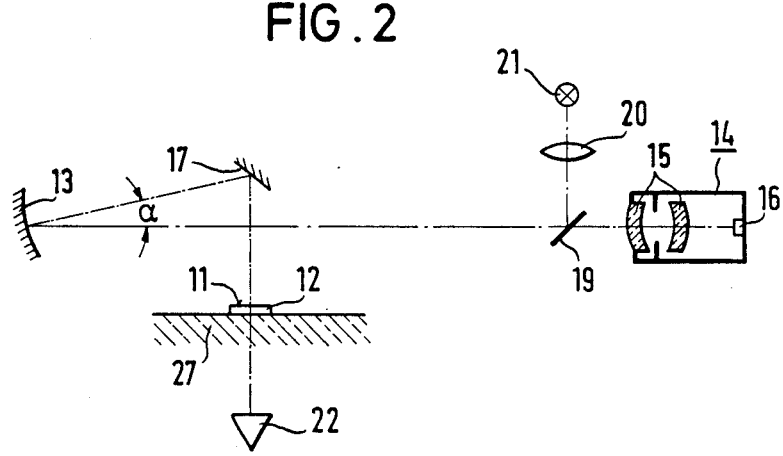
Figure 3:
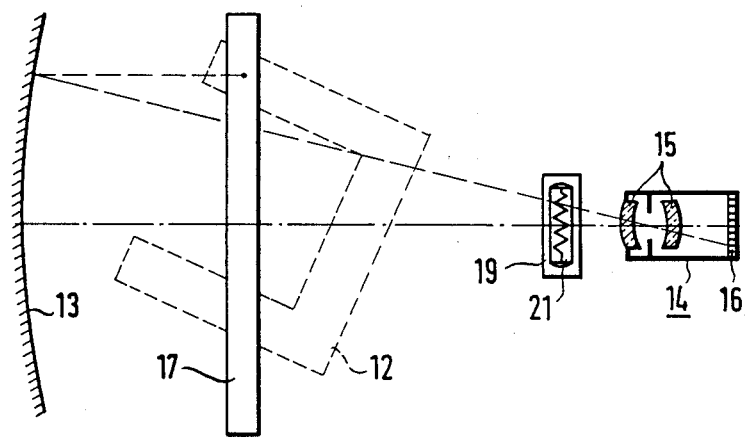

As seen in FIGS. 2 and 3 the object 12 to be illuminated is arranged on a transparent support 27 beneath which a retroreflector 22 is provided which extends parallel to a plane, strip-like mirror 17 provided above the object 12. The retroreflector 22 can consist of a strip-like arrangement of small triple mirrors or a screen of pearls (Scotchlite) and is arranged at such a distance behind the object that its structure lies outside the depth of focus of the image forming means. The plane mirror strip 17 and the strip-like concave mirror 13 are arranged parllel to the direction of the diode row. The plane mirror 17 projects the light coming from the reflector 22 through the object 12 onto the concave mirror 13 in such a way that it is reflected at a small angle α to the objective 15 of the diode row camera 14. The object 12 is arranged in FIGS. 2 and 3 at a smaller distance than the focal length from the concave mirror 13 so that the image forming conditions correspond to the arrangement of the object in the position 11' in FIG. 1.

A beam divider 19 is provided directly in front of the objective 15 via which an illuminating beam path is coupled in through an objective 20 and a strip-like light source 21. The linear extent of the light source 21 corresponds to the linear extent of the diode row 16 so that an illuminated line which has been correspondingly extended many times is generated on the surface 11 of the object 12. In other words, the linear zone on the surface 11 of the object 12 is illuminated over the entire longitudinal extent of the concave mirror 13 by the light source 21.

The strip-like plane mirror 17 and the retroreflector 22 extend parallel to the direction of the diode row and also have corresponding lengths.

Furthermore it can be seen from FIG. 2 that in the case of a reflecting object 12 the arrangement illuminates this object 12 in autocollimation.

Figure 4:
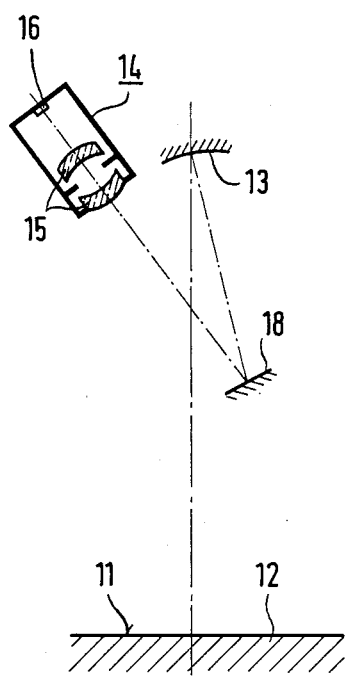

In the embodiment of FIG. 4 the surface 11 of the object 12 is arranged at the distance of the focal length from the concave mirror 13, with a strip-like plane mirror 18 being provided between the concave mirror 13 and the diode row camera 14. The diode row camera 14 is thus optically located at the same distance from the concave mirror 13 as the object 12.

I claim:

1. Telecentric image forming system for a linear zone on a surface of an object comprising a diode row camera with a telecentric imaging system at the object side, wherein the pupil of a normal non-telecentric camera objective (15) is arranged in the focal plane of a spherical concave mirror strip (13) which lies parallel to the direction of a diode row (16); and wherein the concave mirror strip (13) and the camera objective (15) jointly form the image of the linear zone on the diode row (16).

2. Telecentric image forming system in accordance with claim 1, wherein the surface (11) of the object (12) is arranged spaced from the concave mirror strip (13) by the distance of the focal length of the concave mirror strip (13).

3. Telecentric image forming system in accordance with claim 2, wherein the object (12) lies at a distance from the concave mirror strip (13) which is smaller than its focal length.

4. Telecentric image forming system in accordance with claim 1, wherein a plane mirror strip (17) is arranged between the object (12) and the concave mirror strip (13).

5. Telecentric image forming system in accordance with claim 1, wherein a plane mirror strip (18) is arranged between the concave mirror strip (13) and the objective (15).

6. Telecentric image forming system in accordance with claim 1, wherein a beam division takes place in front of the objective (15) of the row camera (14) via a dividing mirror (19), preferably a physical dividing mirror, and wherein via a further objective (20) a light source (21) which is of strip-like construction similar to the diode row (16) is coupled into the beam path via the dividing mirror (19).

7. Telecentric image forming system in accordance with claim 6, wherein, on using a specularly reflecting object (12), the latter is normally illuminated in autocollimation.

8. Telecentric image forming system in accordance with claim 6 for at least partially transparent objects, wherein a retroreflector composed of many individual elements is arranged behind the object, is of strip-like construction, and extends parallel to the direction of the diode row.

* * * * *